Jan. 18, 1949.
J. A. DESCOMBES
KINEMATOGRAPH PROJECTION AND
SOUND REPRODUCING APPARATUS
2,459,628
Filed Jan. 15, 1947
2 Sheets—Sheet 1
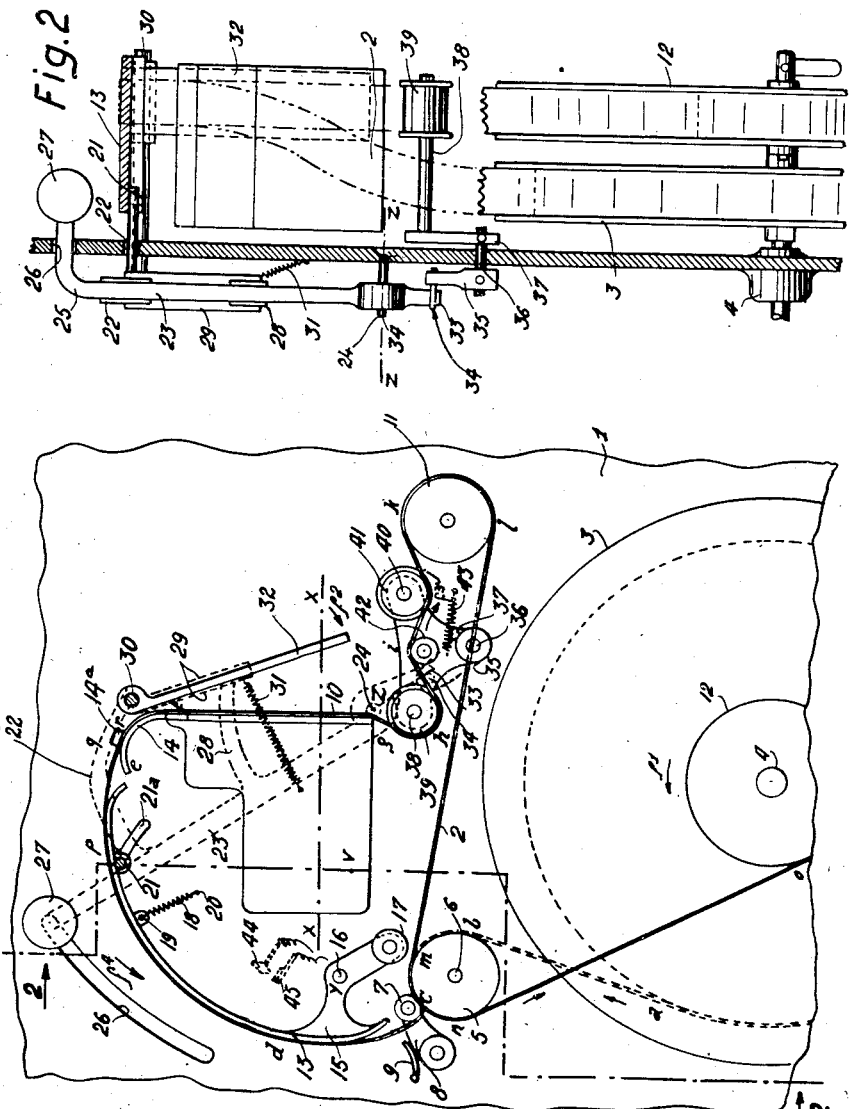
INVENTOR
JULIEN ANTOINE DESCOMBES
by Otto Munk
HIS ATT'Y Jan. 18, 1949.                J. A. DESCOMBES                      2,459,628
                     KINEMATOGRAPH PROJECTION AND
Filed Jan. 15, 1947   SOUND REPRODUCING APPARATUS
                                                                 2 Sheets-Sheet 2

INVENTOR
JULIEN ANTOINE DESCOMBES
BY *Otto Munk*
HIS ATTY

Patented Jan. 18, 1949

2,459,628

UNITED STATES PATENT OFFICE 2,459,628

CINEMATOGRAPH PROJECTION AND SOUND-REPRODUCING APPARATUS

Julien Antoine Descombes, Paris, France, assignor to Societe d'Etudes et de Realisation des Brevets Descombes, Paris, France Application January 15, 1947, Serial No. 722,256
In France May 22, 1946

3 Claims. (Cl. 88—16.2)

The correct positioning or threading of a film in a kinematograph projection and sound reproducing apparatus requires, owing to the complicated path followed by the film, a certain amount of practice for its insertion and great accuracy in the formation of the loops. It is, in fact, necessary not to make any mistake in the order in which the film is successively threaded through the various members (gate, sound detector presser, feeding devices, etc.) and to give to the loops the exact sizes necessary for an accurate registering between the projection of the frames and the sound reproduction. In order to obtain this latter result, it is absolutely necessary that the distance, taken along the film between the track on said film of the geometrical axis of the luminous projection on the one hand and of the optical axis of the sound detector on the other hand, should be absolutely equal to the longitudinal distance which exists on the film between a frame and the sound record which corresponds to it.

Now, in the known apparatus, there exists no practical means enabling the film to be placed in position without any risk of mistake and for automatically giving to the loops of the film the exact dimensions which are such that the above condition is fulfilled.

The present invention has for its object to provide a kinematograph projection and sound reproducing apparatus which is improved so that it enables automatic insertion and threading of the film to be obtained, which prevents any mistake in the positioning of the film and ensures with absolute certainty the registering of the light and sound reproductions, any two conjugated points of the frames and of the sound track being brought, automatically and without hesitation, into register with the optical axes of the light projection device and of the sound detecting device.

The apparatus according to the invention further consists of a device of the kind indicated in which retractable means are provided for the temporary guiding of the film, combined with the presser and a common operating member, in such a manner that, on the one hand these guiding means enable, when in their operative position, the film to be placed automatically in a suitable position relatively to the various members and to the optical projection and sound detection axes, the presser then being remote from the gate, and on the other hand said guiding means are quickly retracted after the presser has been returned to the gate in order to hold the film stationary in the position which has been given to it.

The invention is illustrated in the accompanying drawings which are given solely by way of example and in which:

Fig. 1 is a partial front view of a projection and sound reproducing apparatus, improved according to the invention, this figure showing in particular, the guiding means for the film in their operative positions corresponding to the placing in position of the film;

Fig. 2 is a diagrammatic transverse section along the line 2—2 of Fig. 1;

Figure 3:
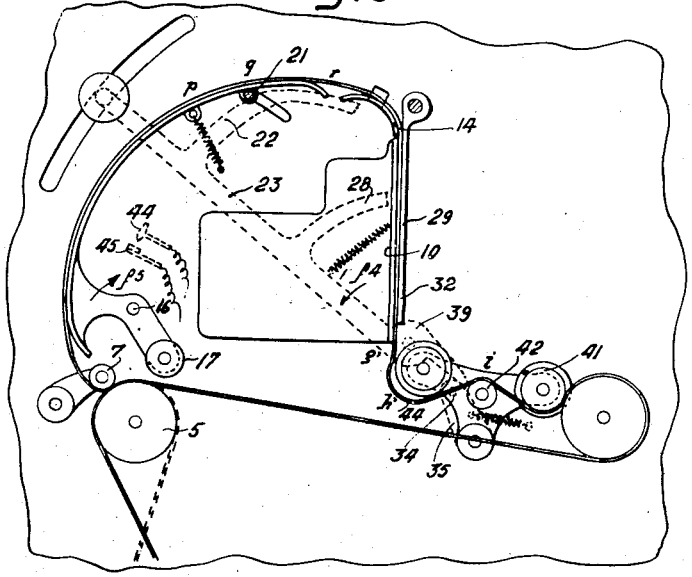
Fig. 3 is a similar view to Fig. 1, after the passage for the film has been closed by clamping down the presser.

According to the embodiment illustrated, the invention is assumed to be applied to a kinematograph projection and sound reproducing apparatus in which the whole device is carried by one of the faces of a supporting plate 1. The film 2 follows a path abc . . . mno. It unwinds from a feed spool 3 arranged against the plate 1 and loosely mounted on a shaft 4 at right angles to said plate 1. The film 2 then passes at bc over a feed device 5 mounted on a spindle 6, against which said film is pressed by a presser roller 7 carried by a lever 8 and retracted by a spring 9. The film then forms a large loop cde and passes through the gate 10 of the projection device whose optical axis is XX, then over the sound detector 11. It then returns at mn over an extension of the feed device 5 and finally winds, at o, on to a receiving spool 12 arranged against the feed spool 3 on the same shaft 4 to which said receiving spool 12 is rotarily secured. Said shaft 4 is driven and therefore drives said receiving spool 12 in the direction of winding of the film (arrow $f^1$). The longitudinal axis of the film passes from the medial plane of the feed spool 3 to the medial plane of the receiving spool 12 during its loop cde.

According to the present invention, the device is completed, opposite the loop cdef, first by a movable arcuate guide 13, then by a fixed guide 14 provided with side cheeks $14^a$.

The movable guide 13 comprises, for example, a suitably curved metal plate. It is carried by a bracket 15 which is pivoted on a spindle 16 carried by the plate 1. Said bracket 15 is extended beyond the spindle 16 and carries a roller 17 intended to bear against the film 2 opposite the feed device 5 on the return side mn of the film, when the guide 13 is in the retracted position of Fig. 4, towards which position said guide constantly tends to be returned by a spring 18 which is fixed at 19 to the guide and at 20 to the plate 1. Fixed to the lower face of the guide 13 by means of a clamp, by welding or otherwise, is a projection or pin 21 which passes through a circular opening 21a in the plate 1, the centre of said opening being located on the geometrical axis Y of the journal 16. The projection 21 extends beyond the plate 1 so as to bear, by the action of the spring 18, against a finger 22 forming a cam. Said finger 22 is carried by an operating lever which is pivoted along an axis Z—Z about a journal 24 carried by the plate 1. The finger 22 has a portion $pq$ which is concentric with the axis Z—Z of the lever 23 and another drooping portion $qr$, which is circular for example, its centre being located at V between the axes YY and ZZ.

The lever 23 has an upper end 25 bent at 90° which passes through an arcuate opening 26, the centre of which is located on the axis ZZ and which is terminated, on the front face of said plate, by a handle 27 or other operating member.

The lever 23 is, in addition, provided with a second finger 28 which is concentric with the axis of rotation ZZ. Said finger 28 is so arranged and is of such a length that, when the lever 23 moves from the intermediate position of Fig. 3 to the extreme position towards the right of Fig. 1, said finger 28 pushes back a flap 29 keyed on a shaft 30 journalled in the plate 1. A spring 31 tends to retract said flap in the direction of the arrow $f^2$. On the shaft 30 is keyed, on the front face of the plate 1, a presser flap 32 which is intended to be pressed by the spring 31 against the projection gate 10 of the projection device. Said presser, which follows the flap 29 in its oscillations, is therefore moved away from the gate 10 when the finger 28 pushes back the flap 29, the lever 23 moving from the position of Fig. 3 to the position of Fig. 1.

The lever 23 is extended beyond its pivot pin 24 by a heel 33 which is adapted to encounter a projection 34. Said projection is carried by a lever 35 keyed on a shaft 36 journalled in the plate 1. On the other face of said plate, on the shaft 36 is keyed a support 37. On said support 37 are rotatably mounted on the shaft 38, a loading roller 39 with cheeks and, on another shaft 40, a presser roller 41 also provided with side cheeks for guiding the film. The support 37 furthermore carries an intermediate tension roller 42. A spring 43 tends to rock the lever 35 and the support 37 about the shaft 36 in the direction of the arrow $f^3$ in which the roller 41 is pressed against the detector device 11.

Figure 4:
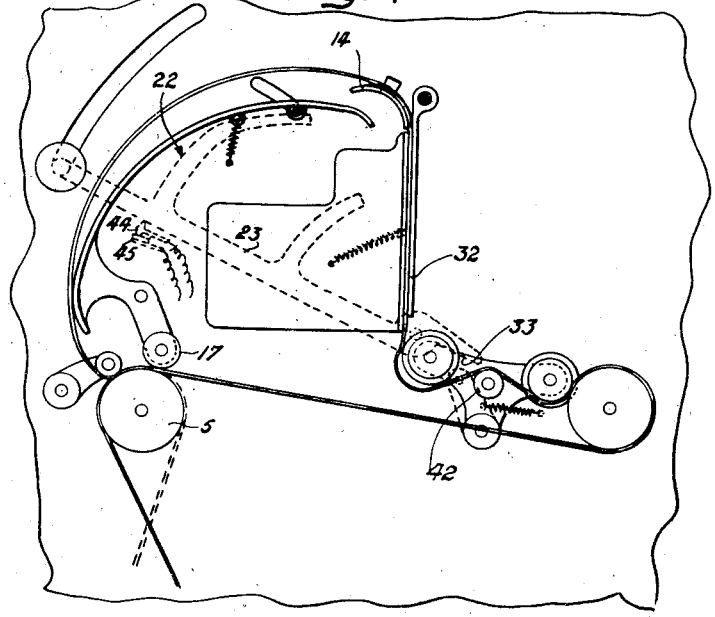
Fig. 4 is a similar view, after complete retraction of the temporary guiding devices.

The device is furthermore provided with a switch, the contacts 44 and 45 of which are so arranged as to be connected to one another by the lever 23 at the end of its inoperative travel (position of Fig. 4). Said switch is connected to the supply circuit of the electric motor driving the apparatus.

Finally the usual shutter of the projection device, the movements of which are connected to the feed claws for the film, is provided or is combined with a marking means enabling said shutter to be brought by hand into a position such that the feed claws for the film are retracted relatively to the gate 10 for the film. The shutter may, for example, be provided with an opening which, for the desired orientation of said shutter, leaves apparent a fixed mark provided on a stationary part located behind the shutter, or again a pointer which moves into register with a fixed mark.

The apparatus operates as follows: Before placing the film 2 in position, the lever 23 is moved into the threading position of Fig. 1, thereby opening the switch 44, 45, and stopping the driving motor of the apparatus. In this position of the lever 23, the projection 21 of the guide 13 rests at $p$ on the part $pq$ of the cam-finger 22 and the guide 13 is rocked upwards about the shaft 16 against the action of the retracting spring 18 which is tensioned. The presser roller 17, secured to said guide 13, is remote from the feed device 5. On the other hand, the finger 28 bearing against the flap 29 against the action of the retracting spring 31, retracts the presser 32 into the raised position of Fig. 1. As regards the heel 33 of the lever 23, it constrains, by means of the projection 34 and the lever 35, the part 37 to rock about the shaft 36 in the opposite direction to the arrow $f^3$ and move into the position of Fig. 1 against the action of the retracting spring 43, the roller 41 being then remote from the sound detector 11.

Furthermore, the operator moves by hand the pointer or the opening of the shutter into register with its mark, so as to be sure that the usual feed claws for the film are retracted relatively to the gate 10 for the film.

When this has been done, the film 2 is unwound from the feed spool 3. The presser 7 is moved away by hand. The film 2 is engaged at $bc$ between said presser and the feed device 5. The part of the film which protrudes from the feed device is passed round the guide 13 and the fixed guide 14, then the film is passed through the gate 10, under the roller 39, over the tension roller 42, between the presser 41 and the sound detector 11, is passed back at $mn$ over the feed device 5 and its free end is finally attached to the receiving spool 12. The film having thus been placed in position, the presser 7 is released and its spring 9 presses it against the feed device 5 which holds the film stationary before it reaches the device described. It should be noted that this placing in position of the film may be made easier for the operator by indicating the path of the film by means of a diagram marked in red on the plate 1.

When the film has thus been placed in position in a practically automatic manner, since it is guided over its entire length, the lever 23 is swung from the position of Fig. 1, about its pivot 38, in the direction of the arrow $f^4$ (Fig. 1). While it is moving from the position of Fig. 1 to the position of Fig. 3, the guide 13 does not move since the projection 21 moves over the part $pq$ of the cam-finger 22 concentric with the axis ZZ of the lever 23. On the other hand, the finger 28 is retracted from the flap 29 and the presser 32 is returned, by the action of the spring 31, into contact with the gate 10 where it clamps the film 2, before the projection 21 reaches the end $q$ of the portion $pq$ of the cam 22. At the same time, the heel 33 of the lever 23 is retracted from the projection of the lever 35 and, by the action of the retracting spring 43, the part 37 rocks about the shaft 36 in the direction of the arrow $f^3$, bringing the roller 41 into contact with the detector 11, wherein the film 2 is then gripped and held stationary. As can be seen, from this instant, the portion of the film between the optical axis XX of projection and the sound detector is held stationary and cannot move at either of its ends, the intermediate portion forming a loop $g'h'i$ (Fig. 3) which is no longer in contact with the roller 39 since said roller has been retracted upwards towards the right. It should be noted that this loop is slightly retracted relatively to the corresponding loop $ghi$ of the film in Fig. 1, since owing to the rocking of the part 37, the roller 41 by moving downwards has slightly pulled the film.

To sum up, when the lever 23 reaches the position of Fig. 3, the film 2 is locked in the gate 10 and between the roller 41 and the detector 11. By continuing to rotate the lever 23 in the direction of the arrow $f^4$, the part $qr$ of the finger 22 comes opposite the projection 21 of the guide 13 and, as the lever 23 is rotated, the guide 13 rocks in the direction of the arrow $f^5$ (Fig. 3) by the action of the retracting spring 18 and finally comes into the retracted position of Fig. 4 while the presser roller 17 bears against the return side of the film opposite the feed device 5. The loop $cde$ of the film is then unsupported, but there is no longer any objection to this, on the contrary, since the film 2 is then released from all friction in this region.

As regards the heel 33 of the lever 23, it has long ago been separated from the projection 34 of the lever 35; the parting of these members occurred slightly before the lever 23 reached the intermediate position of Fig. 3, when the roller 41 pressed the film against the sound detector device 11.

Finally, at the end of its travel towards the inoperative position of Fig. 4, the lever 23 closes the switch 44—45 and the electric motor driving the apparatus can be started by closing another manually controlled switch connected in series.

As can be seen, the guiding device described enables the film 2 to be placed in position in a very convenient and absolutely accurate manner, owing to the fact that the path between the points $c$ and $k$ is accurately determined by the position of the various guide members when the same are in the position of Fig. 1 and said members are only retracted after the film has been locked in the gate 10.

Naturally the invention is in no way limited to the embodiment illustrated and described, which has only been chosen by way of example.

Having thus described my invention what I claim is:

1. In a kinematograph projection and sound reproduction apparatus, the combination of a supporting plate, a projection gate located in a plane perpendicular to said plate, a retractable presser in front of said gate, an arcuate guide located before said projection gate and enabling in its operative position and by its external convex surface a large loop to be formed in the film, said loop being floating when said arcuate guide is retracted in the running position of said apparatus, a second loop forming device between the projection gate and the sound detector of said apparatus, said second device comprising a support pivotally secured to said supporting plate, two rollers and an intermediate tension roller mounted on said support, one of said two rollers forming in the film a loop which remains floating in the retracted position of said roller, the other roller forming a presser against said sound detector, and a rocking lever pivotally mounted on said plate and provided with fingers forming movable abutments for actuating said arcuate guide, said second loop forming device and said presser in such a sequence that said presser is removed from said gate after the arcuate guide and the second loop forming device have been placed in their operative positions and returned to said gate to hold said film stationary in its position before said arcuate guide and said second loop forming device are retracted.

2. In a kinematograph projection and sound reproducing apparatus, a supporting plate, a projection gate, located in a plane perpendicular to said plate, a retractable presser in front of said gate, a bracket pivoted on said plate, an arcuate guide carried by said bracket before said projection gate and having an external convex face enable to form in the film a first loop which remains floating when said arcuate guide is retracted in the running position of said apparatus, a pin carried by said guide and passing through a circular opening of said supporting plate, a spring fixed to said guide and to said plate for retracting said guide, and a second loop forming device located between said projection gate and said sound detector and comprising a shaft journaled in said supporting plate, a support and a lever keyed on said shaft, and, mounted on said support, a first roller adapted to form in the film a second loop which remains floating after said roller has been retracted, a second roller which forms a presser against said sound detector and an intermediate tension roller, in combination with an operating lever pivotally mounted on said plate and comprising: a first finger adapted to act upon said pin carried by said arcuate guide and having a portion which is concentric with the axis of said lever and another drooping portion which is circular, the center thereof being located between the axes of said arcuate guide and of said operating lever, a heel extending beyond the pivot of said operating lever and adapted to encounter said lever keyed on said shaft journalled in said supporting plate, and a second finger, concentric with the axis of rotation of said arcuate guide adapted to act upon said presser, and having such a length that said presser is moved away from said gate only when the two loops forming devices have been placed in their operative positions and is returned to said gate before said guiding means are retracted.

3. A kinematograph projection and sound reproducing apparatus as claimed in claim 2, further comprising a first feed sprocket between the feed spool and said arcuate guide, a second feed sprocket between said sound detector and the receiving spool, and a presser roller carried by said arcuate guide and adapted to bear in the retractable position of said guide against said second feed sprocket.

JULIEN ANTOINE DESCOMBES.

REFERENCES CITED

The following references are of record in the file of this patent:

UNITED STATES PATENTS

| Number | Name | Date |
|---|---|---|
| 1,973,477 | Fritts | Sept. 11, 1934 |
| 1,987,406 | May | Jan. 8, 1935 |
| 2,023,065 | Conrad et al. | Dec. 3, 1935 |
| 2,114,608 | Ross | Apr. 19, 1938 |
| 2,127,143 | Ross | Aug. 16, 1938 |
| 2,172,235 | Aldinger | Sept. 5, 1939 |